US005838125A

United States Patent [19]
Choi

[11] Patent Number: 5,838,125
[45] Date of Patent: Nov. 17, 1998

[54] CONTROL METHOD FOR AN AUTOMATIC DOOR OPENING/CLOSING APPARATUS IN A WASHING MACHINE

[75] Inventor: Ssi Chol Choi, Kyungki-do, Rep. of Korea

[73] Assignee: Samsung Electronics Co., Ltd., Suwon, Rep. of Korea

[21] Appl. No.: 746,143

[22] Filed: Nov. 6, 1996

[30] Foreign Application Priority Data

Nov. 9, 1995 [KR] Rep. of Korea .................. 1995-40474

[51] Int. Cl.[6] .................................................... H02D 1/00

[52] U.S. Cl. .......................... 318/285; 318/446; 318/452; 318/466; 68/12.26

[58] Field of Search .................................... 318/280–286, 318/445–447, 456, 466–470, 452; D32/1–13; 49/13, 31, 32, 279–280, 506; 68/2 R-3 R, 317.8–319.5, 12.26; 134/56 R–58 DL

[56] References Cited

U.S. PATENT DOCUMENTS 3,589,787 6/1971 Messersmith .......................... 312/319
4,383,206 5/1983 Matsuoka et al. ...................... 318/445
4,563,625 1/1986 Kornbrekke et al. .................. 318/608
4,623,179 11/1986 Davis et al. ........................... 292/201
5,520,424 5/1996 Hapke et al. .......................... 292/198
5,546,773 8/1996 Lee ......................................... 68/196

*Primary Examiner*—David S. Martin
*Attorney, Agent, or Firm*—Burns, Doane, Swecker & Mathis, L.L.P.

[57] ABSTRACT

A control method is disclosed that is applicable to a washing machine having an apparatus for automatically opening/closing a washer door using a motor. The control method comprises the steps of operating the motor in a direction to transition the door between open and closed states. When a command to transition the door is entered, door motor operation is stopped if the door is successfully transitioned between states within a predetermined time interval (t1) that is started at the time of the beginning of the operation of the door motor. The door is returned to an original position (e.g., closed) if the door does not transition to a position opposite (e.g., open) the original position by the time interval (t1) elapses.

8 Claims, 6 Drawing Sheets

20
22
23
31
32
33
34
35
36
50
51
52
53

(A)

CONTROL METHOD FOR AN AUTOMATIC DOOR OPENING/CLOSING APPARATUS IN A WASHING MACHINE

BACKGROUND OF THE INVENTION

The present invention relates to a control method for an automatic door opening/closing apparatus in a washing machine, and particularly to a method for coping with abnormal situations that occur during opening/closing operations of the door.

A conventional vertical shaft washing machine, e.g., a pulsator washing machine, has an operable lid (hereinafter referred to as a door) which is located on an upper portion of the housing. The door is frequently opened/closed when loading laundry into or unloading laundry from the laundry tub, adding detergent or rinse, loading additional laundry, settling unbalance spinning, inspecting the progress of a washing cycle, or the like. Consequently, opening and closing of the door may occur frequently even during the execution of a single washing cycle.

The conventional door has caused great inconvenience to users because it requires manual opening and closing.

Moreover, a greater effort is required to open and close the door on a contemporary model as opposed to older machines because newer models are larger in size and have, accordingly, larger and heavier doors.

To solve the aforementioned problems, the subject applicant has developed an automatic door apparatus operative by a simple key operation. This automatic door apparatus, which will be explained in the subsequent "description of preferred embodiment" in detail, largely comprises a switch for issuing a door opening/closing order, a sensor (hereinafter referred to as an open sensor) for indicating an open state of the door, a sensor (hereinafter referred to as a close sensor) for indicating a closed state of the door, a motor for supplying dynamic force required to open/close the door, and a microprocessor for judging the state of the door based on the information supplied from each of the sensors pursuant to a door opening/closing order and controlling the activation of the motor based on the resultant judgement, wherein both sensors are preferably embodied by a reed switch.

In the aforementioned automatic door open/close apparatus, when a door opening/closing demand is present, the door is closed by the motor only when the open sensor senses an open state of the door and the closed sensor does not sense a closed state of the door. Conversely, the door is opened by the motor only when the open sensor does not sense an open state of the door and the close sensor senses a closed state of the door.

When a washing machine with the automatic door is used, several situations can occur which prevent normal automatic operation of the door. For example, there may occur a situation that the door opening operation is prevented because a heavy article is put on the door or that the door closing operation is prevented because an obstacle, such as clothing, is sitting over the doorframe.

The present invention was developed to cope with such abnormal situations that can occur during an automatic opening/closing operation of the door. The object of the present invention thus is to provide a control method for an automatic door opening/closing apparatus in a washing machine, particularly a control method for coping with abnormal situations to prevent automatic opening/closing operation thereby preventing damage to the related parts, as well as making subsequent operation possible.

SUMMARY OF THE INVENTION

In order to accomplish the aforementioned objects, a novel control method is applicable to a washing machine having an apparatus for automatically opening/closing the door. The control method comprises the steps of reversely operating the motor if the door is in a first normal state when a demand for reversion of the door state is present; stopping operation of the motor if the door is reversed to a second normal state within a predetermined time interval (t1) from the time point of the reverse operation of the motor; and, returning the door to the first normal state if the door is not reversed to the second normal state when the time interval (t1) elapses from the time point of the operation of the motor.

In the aforementioned control method, the first normal state of the door is representative of either opened or closed state, while the second state is the opposite of the first normal one.

DETAILED DESCRIPTION OF THE PREFERRED EMBODIMENTS

Figure 1:
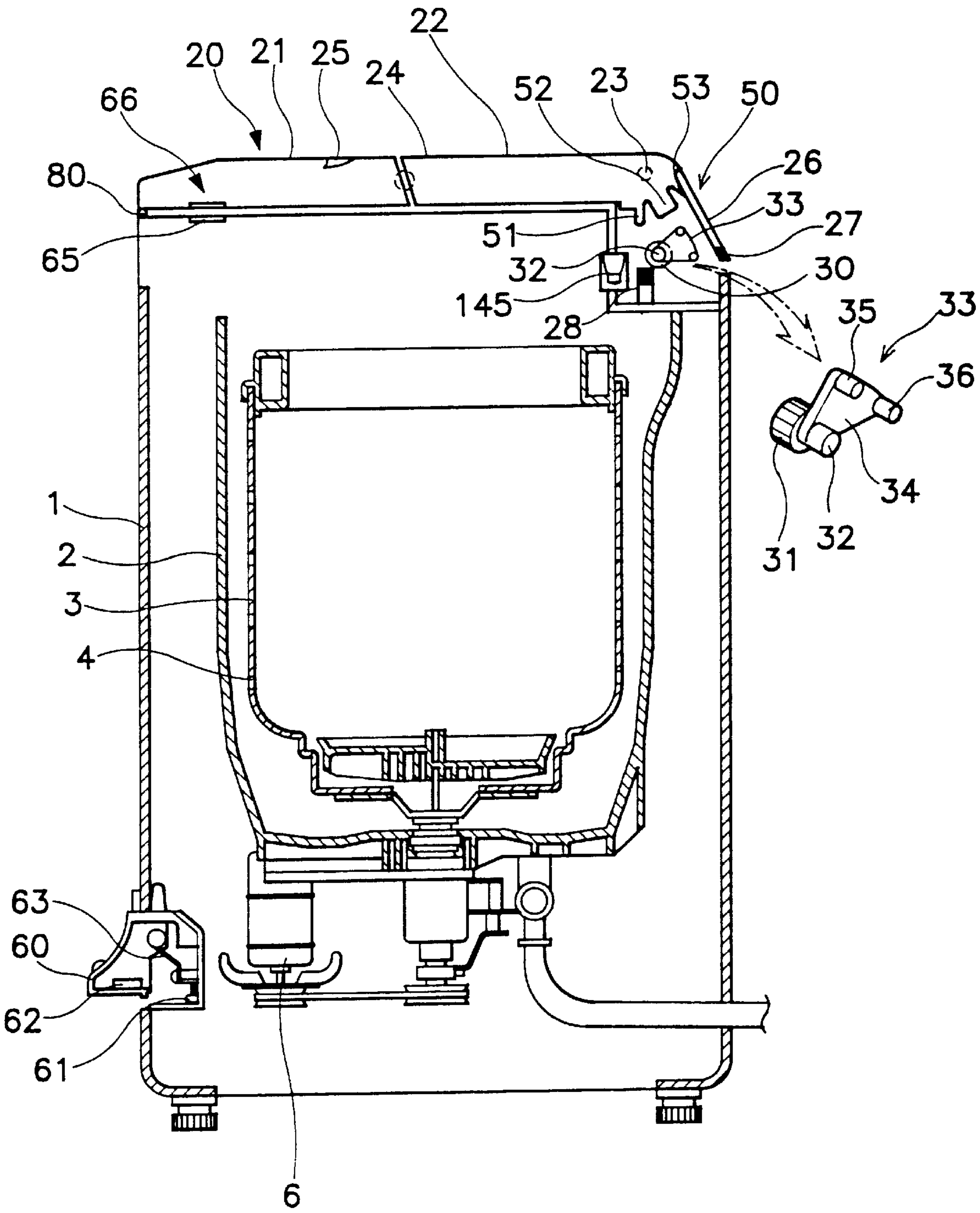
FIG. 1 is a longitudinal sectional view depicting a washing machine having an automatic door opening/closing apparatus adapted for the present invention.

FIG. 1 is a longitudinal sectional view depicting a washing machine with an automatic door opening/closing apparatus according to the present invention. In a washing machine pertinent to the novel door opening/closing apparatus, a water tub 2 formed of a cylindrical body is located in the washing machine's outer casing 1. A laundry tub 3 having a multiplicity of holes formed therein for providing water communication with the water tub 2 is rotatably mounted in the water tub 2.

A door 20 for providing access to the laundry tub 3 is mounted on the upper portion of the outer casing 1, and consists of two parts: a front half member 21 and a rear half member 22.

The rear half member 22 is pivotally connected to a first hinge 23 fixed to a posterior of the outer casing 1. The rear end of the front half member 21 is pivotally coupled with the front end of the rear half member 22 by a second hinge 24. Accordingly, while the door 20 is opening, the front end of the front half member 21 travels toward the rear end of the rear half member 22.

A driving/rotating means 30 for rotating the door 20 forwardly or reversely is secured near the first hinge 23. The driving/rotating means 30 largely consists of a door motor 31 for supplying dynamic force to the door 20 and a rotary member 33 coupled to the shaft of the door motor 31. The rotary member 33 consists of a rotary plate 34 having a fan shape, and first and second bosses 35, 36 protruding beyond a front surface of the rotary plate 34 along an edge thereof.

A cam member 50 is provided near the first hinge 23 in the posterior of the second half member 22, and consists of first through third teeth 51–53. While the rotary member 33 rotates according to the forward or reverse rotation (hereinafter, the direction of opening the door 20 is defined as the forward rotation) of the door motor 31, the first through third teeth 51–53 are properly engaged with the first and second bosses 35, 36, thereby applying rotation torque to the first through third teeth 51–53.

A sensor for detecting the opening of the door 20, which may be preferably embodied by a reed switch 28, is located at a proper position in the posterior of the outer casing 1. It is preferable to enclose the reed switch 28 in a waterproof material.

A permanent magnet 27 is fixed to a lever 26 that extends from the second half member 22. In the aforementioned configuration, the contact point of the reed switch 28 is closed by the magnetic force from the permanent magnet 27 when the door 20 opens to an extent corresponding to "fully open".

A sensor for detecting closing of the door 20, which may be preferably embodied by a reed switch 65, is located at a front and upper portion of the outer casing 1. It is preferable to enclose the reed switch 65 in a waterproof material.

A permanent magnet 66 is positioned in the first half member 21 opposite to the reed switch 65. In the afore-mentioned configuration, the contact point of the reed switch 65 is closed by the magnetic force from the permanent magnet 66 when the door 20 closes to the extent corresponding to "fully closed".

A switch for issuing a door opening/closing order, which may be embodied by a reed switch 61, is located at the front and lower portion of the outer casing 1. It is preferably to enclose the reed switch 61 in a waterproof material. The contact point of the reed switch 61 opens or closes pursuant to the magnetic force from a permanent magnet 62 secured to a pedal 60 which is held in position by the tension force of a leaf spring 63. That is, if user engages the pedal 60, the permanent magnet 62 approaches to the reed switch 61, so that the contact point of thereof is closed.

Reference numeral 25 denotes a handle used for manual opening/closing of the door 20, reference numeral 80 denotes a roller for smooth opening/closing operation of the door 20, and reference numeral 6 denotes a wash motor.

In the afore-mentioned arrangement, the mounting positions and structures of the sensor 28 for door opening, the sensor 65 for door closing, and the open/close switch 61 may be freely modified within the spirit and scope of the invention. For example, the open/close switch may be located at a position operable by hand, rather than a the position operable by foot. In the former case, the switch may be arranged together with other function keys on a control panel (not shown) located at a front and upper portion of the outer casing 1.

Furthermore, taking into consideration that the washing machine is exposed to moisture, the sensor 28 for door opening, the sensor 65 for door closing, and the open/close switch 61 are all embodied by moisture resistant reed switches. However, each switch may be embodied by other common switch types whose contact points open or close by mechanical force.

Figures 2A, 2B, 2C, 2D, 2E:
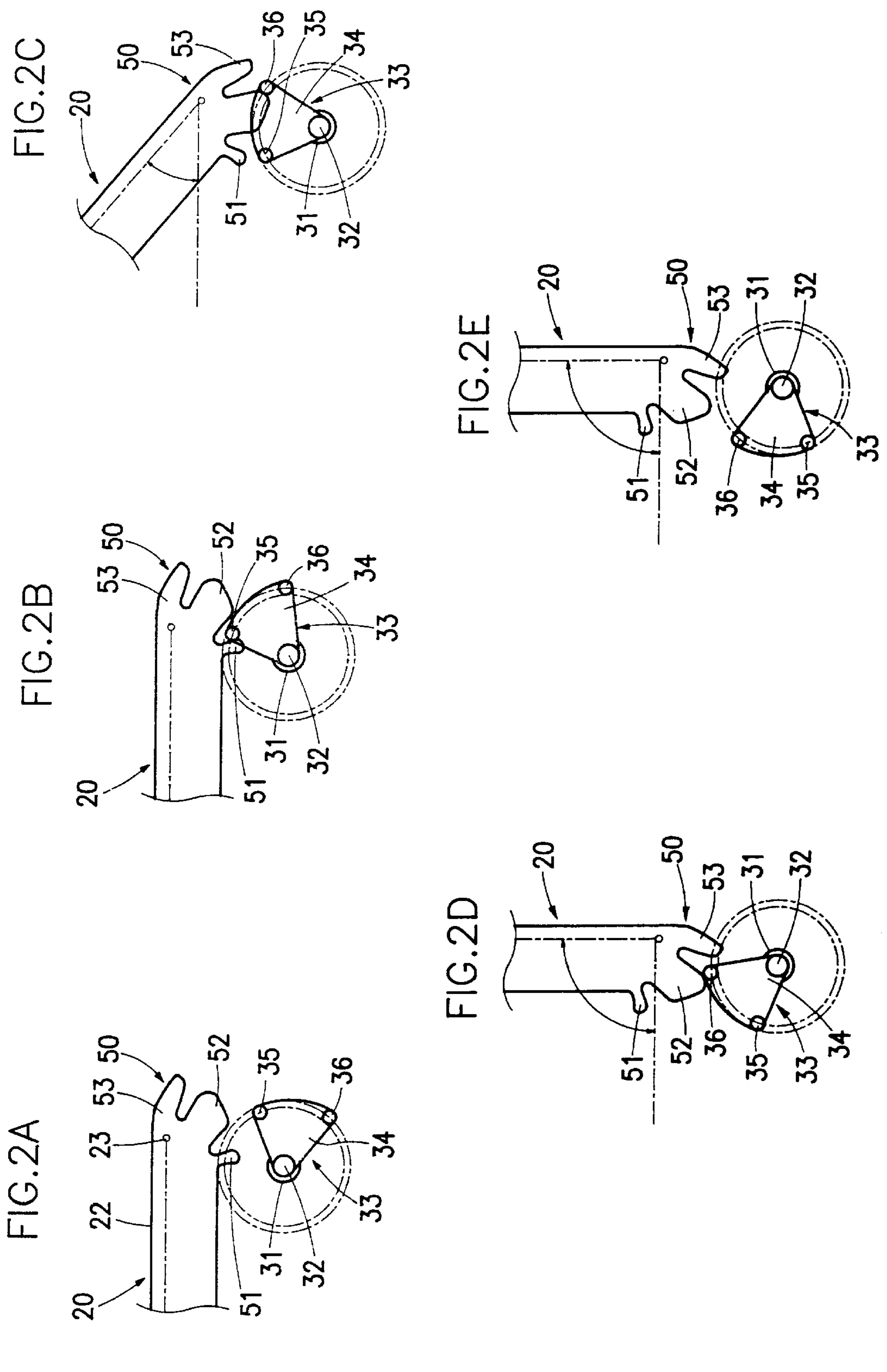
FIGS. 2(A) through 2(E) are partial views showing successive phases of the door opening and closing operation in FIG. 1.

FIGS. 2(A) through 2(E) are partial views showing successive phases of a door opening/closing operation according to the present invention. As shown in FIG. 2(A), when the door 20 is in the "fully closed" state, both of the first and second bosses 35, 36 are outside of the rotating radius of the first through third teeth 51–53. Consequently, the door 20 may be opened or closed by hand.

In this state, if an automatic opening command is issued, that is, a user engages the pedal 60, the door motor 31 is driven, so that the rotary plate 34 is rotated counterclockwise ("forward"). Consequently, the first boss 35 engages with the first tooth 51 as shown in FIG. 2(B). In this state, if the door motor 31 is continually driven forwardly, the front end of the rear half member 22 is gradually raised. In succession, the second boss 36 then engages with the second tooth 52, and rotates together with the second tooth 52 as shown in FIGS. 2(C) and 2(D). After the door 20 fully opens, the second tooth 52 disengages from the second boss 36. Driving of the door motor 31 is stopped before the full opening of the door 20, such that the rotary plate 34 comes to a stop after rotating for some length of time due to the inertia of the door motor 31, as shown in FIG. 2(E). Consequently, the door 20 may be closed by hand even when the door is in a fully opened state.

The automatic door closing operation is the reverse of that of the door opening. That is, if a user engages the pedal 60, the door motor 31 is driven, so that the rotary plate 34 is rotated clockwise ("reverse"). Consequently, the second boss 36 engages the third tooth 53 as shown in FIG. 2(D). In this state, if the door motor 31 is continually driven reversely, the front end of the rear half member 22 gradually goes down. In succession, the first boss 35 is then engaged by the second tooth 52, and rotates together with the second tooth 52 as shown in FIGS. 2(C) and 2(B). After the door 20 fully closes, the second tooth 52 disengages the first boss 35. The driving of the door motor 31 is stopped before the full closing of the door 20, such that the rotary plate 34 comes to a stop after rotating for some length of time due to the inertia of the door motor 31, as shown in FIG. 2(A).

Figure 3:
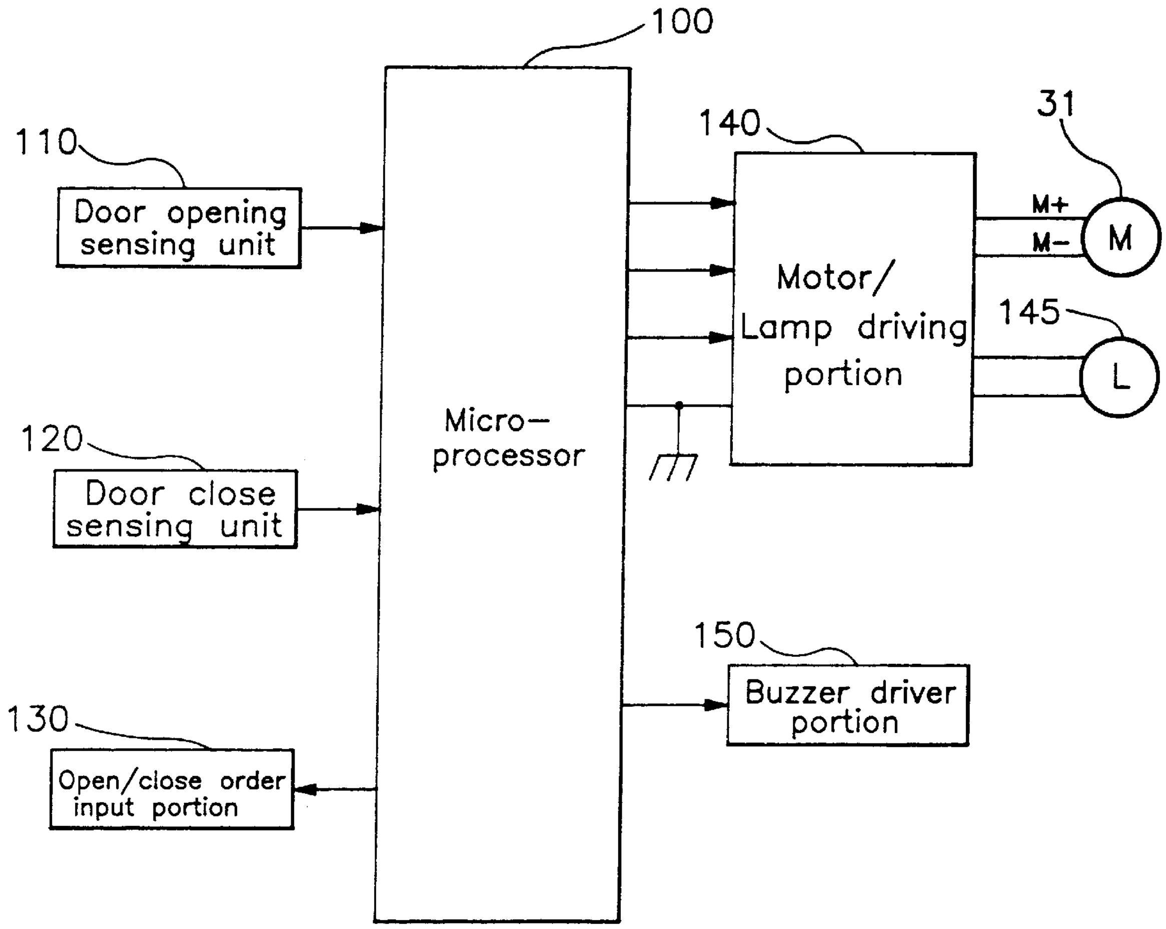
FIG. 3 is a control block diagram for an automatic door opening/closing apparatus adapted for the present invention; and, FIGS. 4(A) through 4(C) are flow charts illustrating a control method according to the present invention.

FIG. 3 is a control block diagram for an automatic door opening/closing apparatus adapted for the present invention. As shown in FIG. 3, the electrical configuration of an automatic door opening/closing apparatus in which the control method of the present invention may be embodied largely consists of a means 130 for issuing door opening/closing order, a means 110 for sensing an open state of the door 20, a means 120 for sensing a closed state of the door 20, the door motor 31 for providing dynamic force to the door 20, an electric lamp 145 for illuminating the interior of the laundry tub 3, a means 140 for driving the door motor 31 and the electric lamp 145, a buzzer driving portion 150 for issuing an error signal when the door 20 malfunctions, and a microprocessor 100 for judging the present state of the door 20 on the basis of information provided from the sensing means 110 and 120 when the order issuing means 130 issues either opening or closing order, and for executing necessary controls.

In the aforementioned configuration, the sensing means 110, 120 may comprise one of the reed switches 28, 65 respectively. The door motor 31 is preferably embodied as a geared D.C. motor that rotates bidirectionally at a slow speed and with high torque.

Hereinafter, the control method according to the present invention will be explained in detail.

Figure 4:
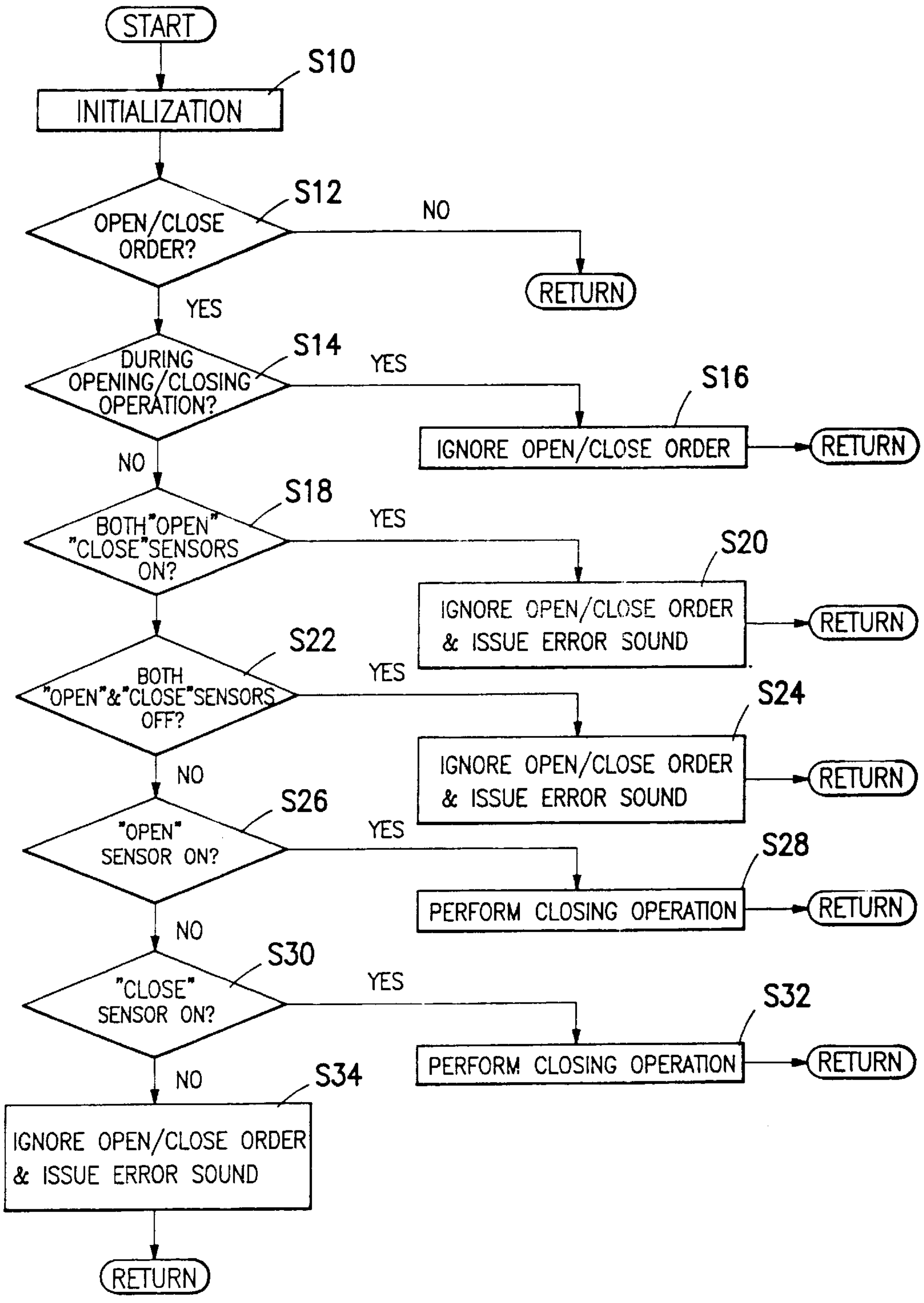
Figure 4B:
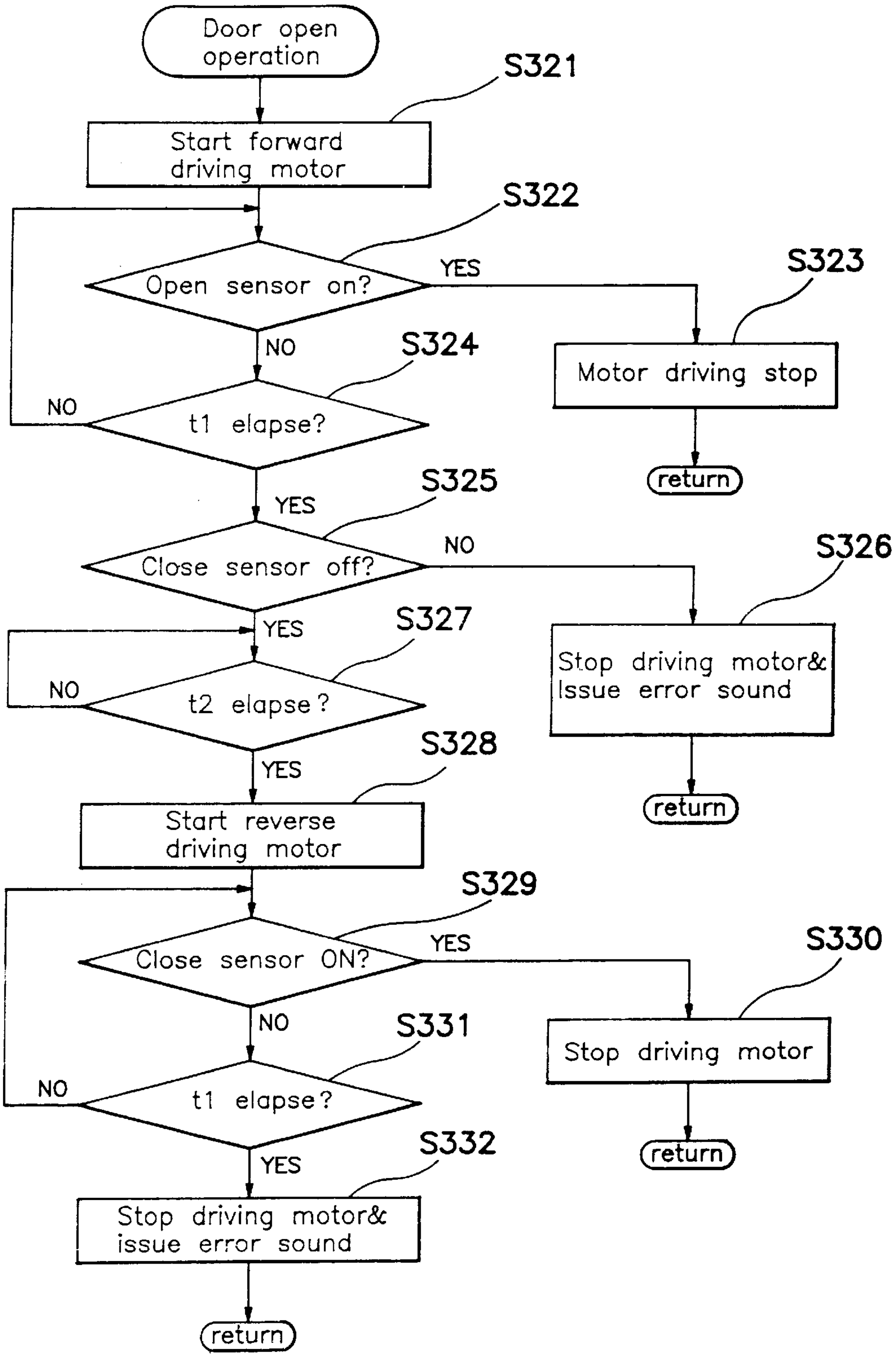
Figure 4C:
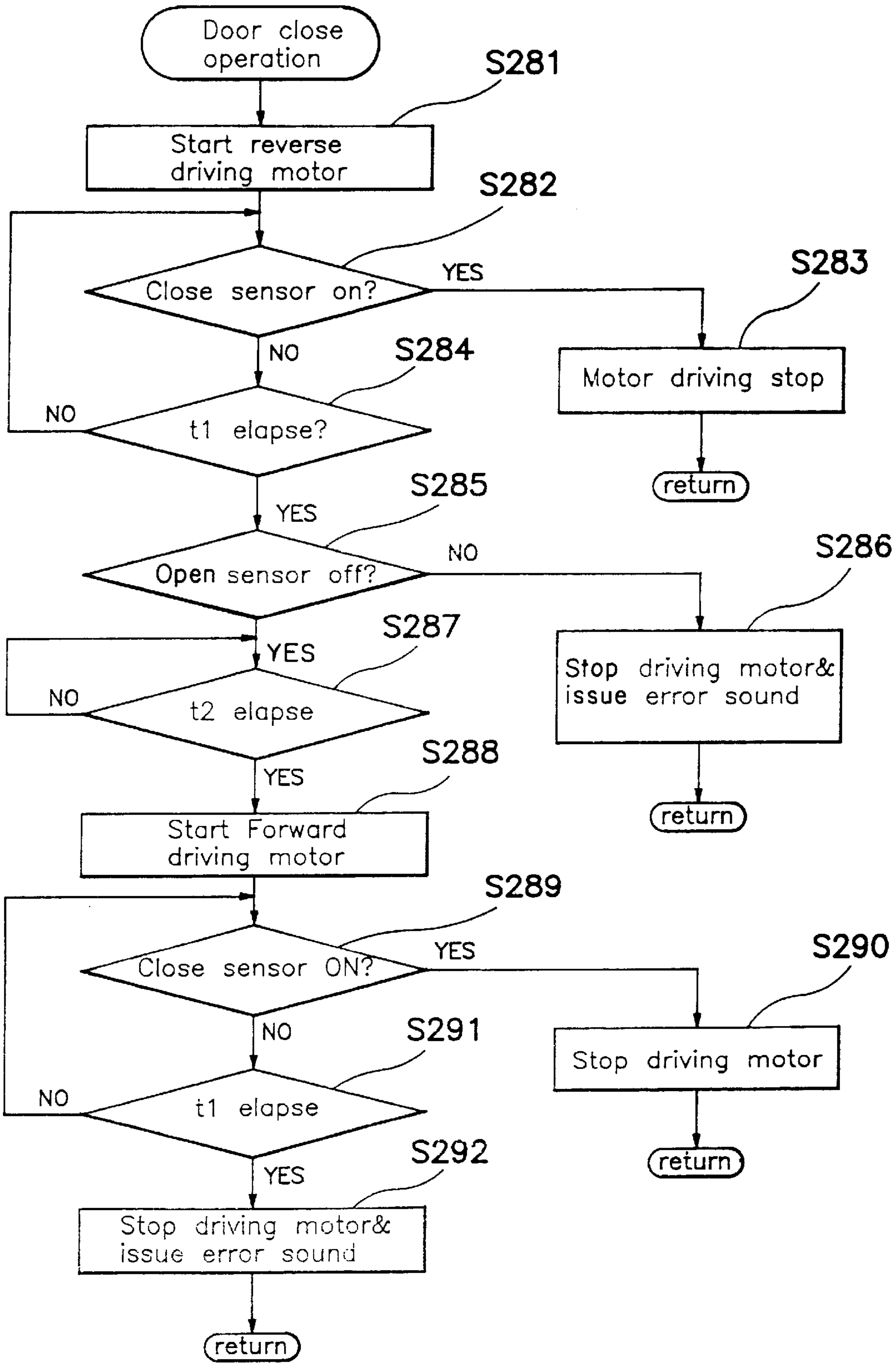

FIGS. 4(A) through 4(C) are flow charts illustrating a control method according to the present invention. The method is preferably executed under the control of the microprocessor 100. Initialization is performed in step S10 when electric power is supplied to the washing machine.

In step S12, the microprocessor 100 determines whether or not a door opening/closing command exists. The depression of the pedal 60 closes the contact point of the reed switch 61, which creates a low-level voltage signal that is sent to an input terminal of the control means 100 (hereinafter called the microprocessor). During step S12, the signal is interpreted by the microprocessor 100 as an opening/closing command.

If the door opening/closing command exists at step S12, the program proceeds to step S14, where the microprocessor 100 judges whether or not a door opening/closing operation is in progress. If opening/closing is in progress at step S14, the program proceeds to step S16, where the microprocessor 100 ignores the door opening/closing command.

If door opening/closing is not in progress in step S14, the program proceeds to step S18, where the microprocessor 100 determines whether the contact points of the reed switch 28 (hereinafter called the open sensor) and the reed switch 65 (hereinafter called the close sensor) are closed ("on" state). In the case where both the open sensor 28 and closed sensor 65 are on, the input terminals of the microprocessor 100 receive low-level voltages, and step S18 indicates a "yes" value.

If both the open sensor 28 and close sensor 65 are "on" in step S18, it means that the door 20 is in both opened state and closed state. This case may occur when either the open sensor 28 or the close sensor 65 is out of order. Accordingly, the program proceeds to step S20 where an error sound is issued and the door motor 31 is not driven.

If at least one of the sensors 28, 65 is in "off" state in step S18, the program proceeds to step S22, where the microprocessor 100 determines whether both the open sensor 28 and closed sensor 65 are off or not. The case where both the open sensor 28 and closed sensor 65 are off in step S22 means that the door 20 is between the opened and closed states. Accordingly, the program proceeds to step S24, where an error sound is issued and the door motor 31 is not driven.

If one of the sensors 28 or 65 is on during step S22, the program proceeds to step S26 where the microprocessor 100 determines if it is the open sensor 28 that is on, which corresponds to the door 20 being fully open. If step S26 returns a "yes" value, the program proceeds to step S28 where the door closing operation is performed.

Hereinafter, further specific explanation will be made for the door closing operation. As shown in FIG. 4(C), the door motor 31 is reversely rotated in step S281, and a determination is made as to whether the close sensor 65 is in "on" state in step S282.

If the close sensor 65 is not in "on" state in step S282, the program then branches to step S284 where the microprocessor 100 determines whether or not a predetermined time interval (t1) , for example, 6.5 seconds, has elapsed from the beginning of the reverse rotation. If the time interval (t1) has not elapsed in step S284, then steps S282 and S284 are repeatedly performed.

The reason for determining whether or not the time interval (t1) has elapsed in step S284 is to control the door motor 31 in an abnormal situation such as when the door 20 cannot be closed, for example, because clothing is sitting over the doorframe. The time interval (t1) may be obtained by summing a small time margin with the necessary time for the door motor to ordinarily rotate from an open position to a closed position when a minimum of commercial power is supplied, for example, minus 15% from the nominal voltage where the door motor 31 would rotate at a relatively low speed.

If the close sensor 65 indicates an "on" state within the time interval (t1) during steps S282 and S284, it means that the closing operation has been completed. Thus, the program proceeds to step S283 where the microprocessor 100 causes the door motor 31 to be stopped.

If on the other hand the close sensor 65 does not indicate an "on" state within the time interval (t1) during steps S282 and S284, it means that an abnormal situation has occurred. In this state, if the door motor 31 stops its rotation, the parts related to the door may be damaged and subsequent automatic door opening/closing operation may become impossible. In addition, considerable energy is needed for opening/closing the door 20 by hand because the first and second bosses 35, 36 may be engaged with the first through third teeth 51–53.

In this case, taking into consideration such problems, the door 20 returns to a previous state, that is, the opened state. In order to do this, a determination is first made as to whether or not the open sensor 28 is in an "off" state in step S285. If the open sensor 28 is in an "off" state in step S285, it means that the door 20 is positioned between the open and closed states by the reverse rotation of the door motor 31 at step S281.

If on the other hand the open sensor 28 is in an "on" state at step S285, it indicates that the door 20 may be stuck in a closed state in spite of the reverse rotation of the door motor 31 at step S281. This case may occur when a heavy article is put on the door 20. If the open sensor 28 is in an "on" state in step S285, then the program proceeds to step S286 where the microprocessor 100 causes the operation of the door motor 31 to stop and causes an error sound to be issued.

If the open sensor 28 is in an "off" state at step S285, the program proceeds to step S288 where the microprocessor 100 causes the door motor 31 to be rotated forward. If, however, the door motor 31 is forwardly rotated immediately following the completion of the reverse rotation of the door motor 31, the power supply, namely a low voltage transformer may be damaged due to the reverse-induced voltage of the door motor 31. Accordingly, the step S288 is performed after a predetermined time interval (t2), for example, a 0.5 second delay in step S287.

Next, a return operation of the door 20 is performed through steps S289, S290 and S291 whose step are identical in reverse to those of the previously described steps S282, S283 and S284 with the exception that the door motor 31 is forwardly rotated, therefore, further explanation will be omitted.

If the open sensor 28 does not change to an "on" state within the time interval (t1) in steps S289 and S291, it means that the door 20 can neither open and close. In this case, the program proceeds to step S292 where the microprocessor 100 causes the door motor 31 to be stopped and causes an error sound to be issued.

Because the door 20 is at a standstill between the open and closed states, a user ought to open or close the door 20 by hand after removing the obstacle on the door 20. After the door is opened or closed by hand, the door 20 can be automatically opened or closed again.

Returning to FIG. 4(A), the microprocessor 100 determines whether or not the sensor in an "on" state is the close sensor 65 in step S30. If only the close sensor 65 is in an "on" state at step S30, it means that the door 20 is fully closed. Accordingly, the program proceeds to step S32, where the door opening operation is performed.

FIG. 4(B) shows the procedures of the door opening operation which is identical to the door closing operation as described in FIG. 4(C) with the exception that the respective kind of sensor in steps S322, S325 and S329 is contrary to that in steps S282, S285 and S289, and that the respective rotating direction of the door motor 31 in step S321 and S328 is contrary to that in steps S281 and S288.

Returning to FIG. 4(A) again, if the close sensor 65 is in an "off" state in step S30, the program proceeds to step S34, where an error sound is issued without driving the door motor 31.

The specific examples illustrated and described herein are to be taken as exemplary only. Various changes beyond the embodiment described may occur to those skilled in the art and are to be understood as forming a part of the present invention insofar as they fall within the spirit and scope of the appended claims.

What is claimed is:

1. A method for controlling an automatic door opening/closing apparatus of a clothes washing machine, the washing machine including a casing, a door mounted on said casing for manual movement between open and closed positions, and a motor operably connected to said door for automatically moving said door between said open and closed positions, the motor being operable in a forward direction for opening the door and operable in a reverse direction for closing the door, the method comprising the steps of:

A) operating said motor in said reverse direction if said washing machine door is in an open position when a command for closing said door is entered;

B) stopping operation of said motor if said door reaches a closed position within a predetermined time interval from the initiation of the reverse-direction operation of said motor;

C) operating said motor in said forward direction for returning said door to said open position if said door leaves said open position but does not reach said closed position within said predetermined time interval;

D) operating said motor in said forward direction if said door is in said closed position when a command for opening said door is entered;

E) stopping operation of said motor if said door reaches said open position within said predetermined time interval from the initiation of the forward-direction operation of the motor; and F) operating said motor in said reverse direction for returning said door to said closed position if said door leaves said closed position but does not reach said open position within said predetermined time interval.

2. A method according to claim 1 wherein said predetermined time interval constitutes a first predetermined time interval, and wherein the initiation of each of steps C and F is delayed for a second predetermined time interval following a lapsing of said first predetermined time interval.

3. A method according to claim 2 wherein said second predetermined time interval is established based on a reverse-induced voltage of the motor.

4. A method according to claim 2 wherein step C comprises: stopping operation of said motor if said door is returned to said open position within a third predetermined time interval from the initiation of said forward-direction operation of said motor, and stopping operation of said motor and emitting an error sound if said door is not returned to said open position within said third predetermined time interval; and step F comprises: stopping operation of said motor if said door is returned to said closed position within said third predetermined time interval, and stopping operation of said motor and emitting an error sound if said door is not returned to said closed position within said third predetermined time interval.

5. A method according to claim 4 wherein said first and third predetermined time intervals are equal to one another.

6. A method according to claim 1 wherein said predetermined time interval comprises a time interval sufficient for moving said door between said open and closed positions.

7. A method for controlling an automatic door opening/closing apparatus of a clothes washing machine, the washing machine including a casing, a door mounted on said casing for manual movement between open and closed positions, and a motor operably connected to said door for automatically moving said door between said open and closed positions, the motor being operable in a forward direction for opening the door and operable in a reverse direction for closing the door, the method comprising the steps of:

A) operating said motor in said reverse direction if said washing machine door is in an open position when a command for closing said door is entered;

B) stopping operation of said motor if said door reaches a closed position within a predetermined time interval from the initiation of the reverse-direction operation of said motor;

C) stopping operation of said motor if said door does not leave said open position within said predetermined time interval;

D) operating said motor in said forward direction if said door is in said closed position when a command for opening said door is entered;

E) stopping operation of said motor if said door reaches said open position within said predetermined time interval from the initiation of the forward-direction operation of the motor; and F) stopping operation of said motor if said door does not leave said closed position within said predetermined time interval.

8. A method according to claim 7 wherein said predetermined time interval comprises a time interval sufficient for moving said door between said open and closed positions.

* * * * *